United States Patent
McDowell et al.

(10) Patent No.: US 11,608,950 B2
(45) Date of Patent: Mar. 21, 2023

(54) STREETLIGHT RETROFIT TO PROVIDE ACCESS FOR WIRELESS AND CELLULAR NETWORKS

(71) Applicant: T-Mobile USA, Inc., Bellevue, WA (US)

(72) Inventors: Tony R. McDowell, Plantation, FL (US); Victor Manuel Tapia Vicencio, Southwest Ranches, FL (US); Ledger Wesley Kellier, Plantation, FL (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 17/188,871

(22) Filed: Mar. 1, 2021

(65) Prior Publication Data

US 2021/0262628 A1    Aug. 26, 2021

Related U.S. Application Data

(63) Continuation of application No. 15/672,008, filed on Aug. 8, 2017, now Pat. No. 10,935,198.

(Continued)

(51) Int. Cl.
*F21S 8/08* (2006.01)
*F21V 29/67* (2015.01)
(Continued)

(52) U.S. Cl.
CPC .............. *F21S 8/086* (2013.01); *F21V 23/02* (2013.01); *F21V 23/0464* (2013.01);
(Continued)

(58) Field of Classification Search
CPC ......... F21W 2131/103; F21W 2131/10; F21W 2131/105; F21S 8/086; H04W 4/80
See application file for complete search history.

(56) References Cited

U.S. PATENT DOCUMENTS 4,652,890 A * 3/1987 Crean .................... H01Q 1/125
                                                    248/185.1
5,655,375 A * 8/1997 Ju .......................... F25B 21/04
                                                    62/3.2
(Continued)

FOREIGN PATENT DOCUMENTS

KR         200467384       6/2013
KR         101537367 B1    7/2015
(Continued)

OTHER PUBLICATIONS

Office Action for U.S. Appl. No. 15/672,008, dated Jul. 23, 2020, McDowell, "Streetlight Retrofit to Provide Access for Wireless and Cellular Networks", 20 Pages.

(Continued)

*Primary Examiner* — Vibol Tan
(74) *Attorney, Agent, or Firm* — Lee & Hayes, P.C.

(57) ABSTRACT

A system for upgrading and retrofitting existing streetlights. The system enables conventional streetlights using sodium vapor, and other conventional lighting technologies, to be upgraded to more energy efficient and long-lasting LED lighting. At the same time, cellular and wireless communications can be added to the streetlight to provide additional bandwidth over that provided by conventional cell towers. The system can offload bandwidth in otherwise overloaded areas, such as densely populated urban areas. The system can include mini- or micro-cellular routers, GPS, Wi-Fi, Bluetooth®, and other micro cellular and wireless technologies. The system can include a light fixture styled to look like existing conventional light fixtures and can be retrofitted to existing streetlight poles and mounts with little, or no, modification to the pole and wiring.

20 Claims, 9 Drawing Sheets

Related U.S. Application Data

(60) Provisional application No. 62/373,651, filed on Aug. 11, 2016.

(51) Int. Cl.

| | | |
|---|---|---|
| *H05B 47/19* | (2020.01) | |
| *F21V 29/15* | (2015.01) | |
| *F21V 29/70* | (2015.01) | |
| *F21V 23/02* | (2006.01) | |
| *F21V 23/04* | (2006.01) | |
| *G02B 6/46* | (2006.01) | |
| *H01Q 1/22* | (2006.01) | |
| *H02G 1/00* | (2006.01) | |
| F21V 29/83 | (2015.01) | |
| H01Q 1/24 | (2006.01) | |
| F21V 29/507 | (2015.01) | |
| H02G 3/20 | (2006.01) | |
| F21Y 115/10 | (2016.01) | |
| H04W 4/80 | (2018.01) | |
| H04W 88/02 | (2009.01) | |

(52) U.S. Cl.
CPC ............. *F21V 29/15* (2015.01); *F21V 29/67* (2015.01); *F21V 29/673* (2015.01); *F21V 29/677* (2015.01); *F21V 29/70* (2015.01); *G02B 6/46* (2013.01); *H01Q 1/22* (2013.01); *H02G 1/00* (2013.01); *H05B 47/19* (2020.01); *F21V 29/507* (2015.01); *F21V 29/83* (2015.01); *F21Y 2115/10* (2016.08); *H01Q 1/246* (2013.01); *H02G 3/20* (2013.01); *H04W 4/80* (2018.02); *H04W 88/02* (2013.01)

(56) References Cited

U.S. PATENT DOCUMENTS

| | | |
|---|---|---|
| 2007/0081338 A1 | 4/2007 | Kuan |
| 2010/0328932 A1 | 12/2010 | Fogerlie |
| 2013/0077313 A1 | 3/2013 | Chen |
| 2013/0134880 A1 | 5/2013 | Rea et al. |
| 2015/0086213 A1 | 3/2015 | Pederson et al. |
| 2015/0091772 A1* | 4/2015 | Schneider ............. H01Q 19/18 343/807 |
| 2015/0362172 A1* | 12/2015 | Gabriel ................. H04N 7/183 348/151 |
| 2015/0373556 A1 | 12/2015 | Oren-Pines et al. |
| 2016/0381768 A1 | 12/2016 | Noesner |
| 2017/0122546 A1* | 5/2017 | Abbott ................... F21S 9/035 |
| 2017/0231053 A1 | 8/2017 | Underwood et al. |
| 2018/0045388 A1 | 2/2018 | McDowell et al. |
| 2018/0172243 A1 | 6/2018 | Clynne et al. |

FOREIGN PATENT DOCUMENTS

| | | |
|---|---|---|
| WO | WO2012129243 | 9/2012 |
| WO | WO2015054611 | 4/2016 |
| WO | WO2016134976 | 9/2016 |

OTHER PUBLICATIONS

Office Action for U.S. Appl. No. 15/672,008, dated Oct. 1, 2019, McDowell, "Streetlight Retrofit to Provide Access for Wireless and Cellular Networks", 14 pages.

The PCT Search Report and Written Opinion dated Nov. 20, 2017 for PCT application No. PCT/US2017/046214, 13 pages.

Mexican Office Action dated Mar. 3, 2022 for Mexican Patent Application No. MX/a/2019/001686, a foreign counterpart to U.S. Pat. No. 10,935,198, 6 pages.

\* cited by examiner

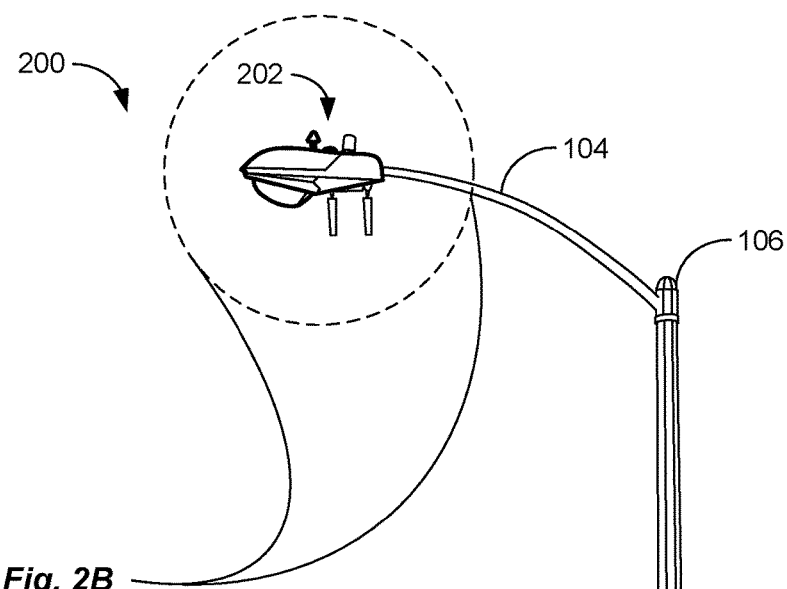
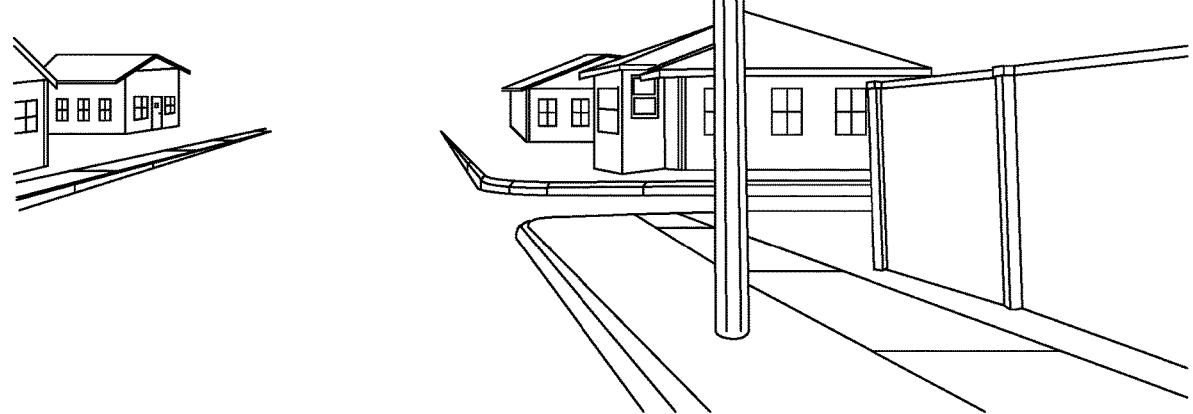
Fig. 2A
Fig. 2B

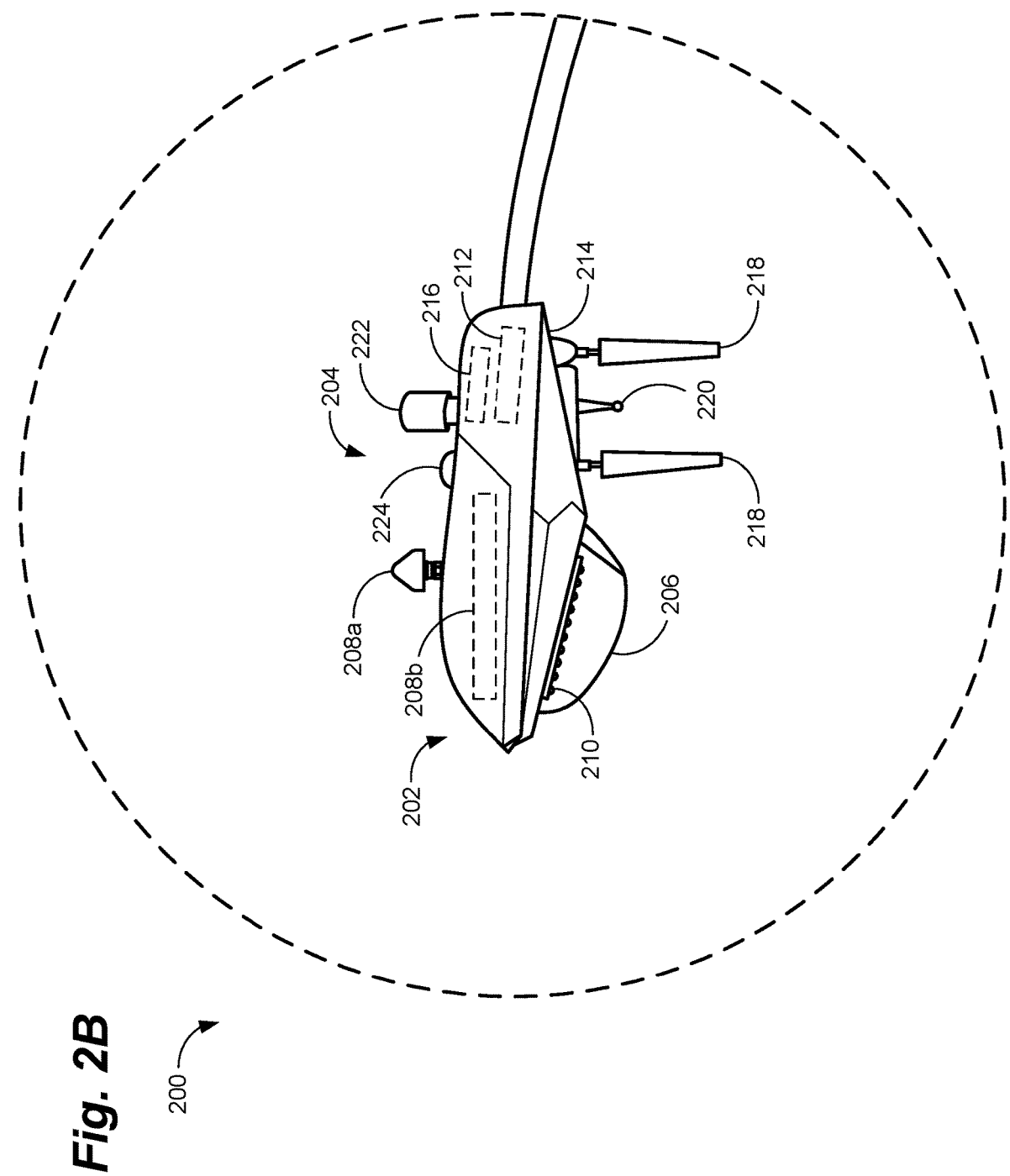

STREETLIGHT RETROFIT TO PROVIDE ACCESS FOR WIRELESS AND CELLULAR NETWORKS

CROSS REFERENCE TO RELATED APPLICATIONS AND PRIORITY CLAIM

This application is a continuation of, and claims priority to, U.S. patent application Ser. No. 15/672,008, filed on Aug. 8, 2017, of the same title, which is a non-provisional of, and claims priority under 35 U.S.C. § 119(e) to, U.S. Provisional Patent Application No. 62/373,651, of the same title, filed Aug. 11, 2016, the entire contents of both which are hereby incorporated by reference.

BACKGROUND

Cellular networks are capable of propagating and receiving frequencies used for both data and voice communications. These voice and data connections are generally sessions originated at a central switch center and transported via fiber optic cable to a radio base station (e.g., eNodeB, or eNB) for LTE or other wireless technology and propagated by the use of antennas. A majority of these antennas are mounted on traditional cell towers (also known as macro cells), but can also be in the form of mini cells, micro wireless devices, and other technologies. In densely populated areas, such as large urban centers, the bandwidth required can outpace the bandwidth provided by large cell towers.

The number of conventional cell towers in a given location is often limited by local zoning codes, space availability, and the capital investment required to install a cell tower. Installing a standard cell tower, for example, can cost from several hundred thousand dollars to millions of dollars. In addition, many people do not want a cell tower installed near them because they consider them to be an eyesore and harmful to health. Unfortunately, cellular devices, such as cellular phones, smart phones, and tablet computers, for example, have relatively limited ranges over which they can send and receive cellular signals. Thus, cell towers must be relatively close together to provide sufficient coverage and desired bandwidth throughput.

In urban locations, however, streetlights are ubiquitous, with streetlights barely 100 feet apart in many locations. Due to their relatively old technology (e.g., sodium vapor bulbs), however, many of these streetlights consume excessive amounts of power (e.g., approximately four hundred watts). This energy consumption is due in large part to the amount of energy that is converted into heat instead of light by conventional lighting technologies such as sodium vapor. As a result, these fixtures also tend to operate at high temperatures.

DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIG. 2A is a perspective view of the cobra head streetlight retrofitted with an example of a cellular communications micro wireless device, in accordance with some examples of the present disclosure.

FIG. 2B is a detailed, side view of the cobra head streetlight with micro wireless device of FIG. 2A, in accordance with some examples of the present disclosure.

DETAILED DESCRIPTION

Figure 1:
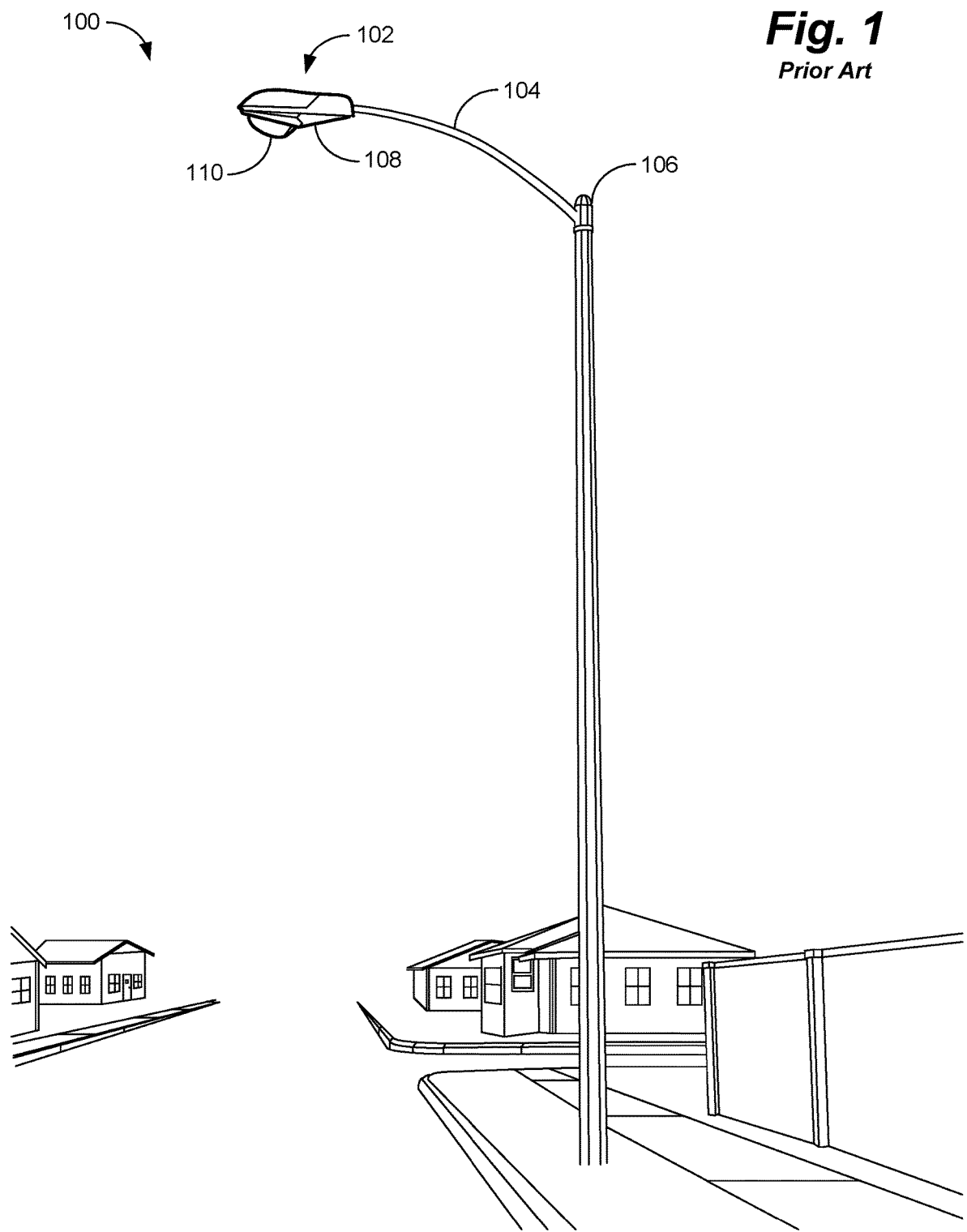
FIG. 1 is a perspective view of a conventional "cobra head" streetlight.

Streetlight assemblies, often called "cobra head" streetlights, can be made of metal and are generally equipped with a light sensor, a transformer, and a sodium vapor bulb. Due to their relatively old technology, however, these sodium vapor light fixtures consume approximately four hundred watts of electricity. This energy consumption is due in large part to the amount of energy that is used to ignite the gases to a state in which they can emit light. This process is energy and heat intensive with the byproduct generating more heat than light for the amount of power supplied.

Light emitting diodes (LEDs), on the other hand, are capable of emitting the same or more amount of light as conventional bulbs, but with significantly lower power consumption and heat output. This process uses significantly less energy than traditional incandescent and even fluorescent lighting (up to 65% less energy). In addition, the color of LED bulbs can be changed using different compounds in the LED itself, modulating the voltage and/or frequency of the LED power supply, and even using LED combinations (e.g., red/blue/green LED clusters).

Unfortunately, despite their long-term benefit, LED bulbs remain more expensive than conventional bulbs and can require additional retrofitting for use (e.g., light controllers, heat sinks, etc.). Financially disadvantaged municipalities, therefore, may be unwilling or unable to convert their streetlights to LED. Thus, providing LED streetlight retrofits to municipalities, can provide significant infrastructure savings during installation and can significantly reduce power consumption after installation.

In densely populated areas, such as urban centers, another issue that arises is providing sufficient cellular bandwidth for all users. Urban areas have bandwidth shortages for numerous reasons. Urban areas tend to be densely populated in the first place. In addition, urban dwellers are more likely to have, and use, cellular devices. In addition, the distance from the cell tower to the users, which can be significant in urban areas, affects the available bandwidth from the cellular service to the cellular device. Finally, due to the number and size of buildings, interference is an issue and it can also be difficult to find suitable locations for cell towers. Occupants of high-rise apartments, for example, may not wish their view to be interrupted by large cell towers in the middle of an urban area.

It would be convenient, therefore, to have a system that is easily retrofittable to existing streetlights, that improves both lighting efficiency and adds cellular (or other) bandwidth at the same time. The system can include a standard cobrahead style light fixture that can blend in with existing light fixtures and other structures fitted with updated lighting technology (e.g., an LED array or LED bulb). The system can also include a cellular micro wireless device (e.g., a micro, femtocell, picocell or remote radio head (RRH)) and/or micro wireless device (e.g., Wi-Fi or Bluetooth®) to provide additional cellular bandwidth and internet connectivity. The system preferably simply replaces existing streetlight fixtures with little, or no, site modifications required.

To this end, examples of the present disclosure comprise a system for retrofitting existing streetlight fixtures to include both updated LED lights and cellular, wireless, and other components. These components can include, for example, a micro wireless device to enable the streetlight system to deliver additional bandwidth and offload a predetermined amount of bandwidth from traditional cell towers and onto the micro wireless device in the streetlight system. The system can be contained in an enclosure designed to mimic existing streetlights for easy retrofits. Installation can be as simple as removing an existing cobra head fixture and replacing it with a new cobra head fixture with the additional features discussed herein. The system can include an architectural enclosure capable of both providing light and propagating frequencies for use with both voice and data networks. The system can comprise a housing having one or more data inlets, LEDs, a cellular router, such as a micro wireless device, and one or more antennas for multiple frequencies and/or multiple communications channels.

The micro wireless device and other components of the system can be accessed remotely using wireless technologies (e.g., Bluetooth®, 802.11x, or other wireless standards) or via a physical connection (e.g., Ethernet, coaxial, or fiber optics) for the purpose of configuring, updating, and maintaining the micro wireless device, LED controller (if applicable), and other components. The micro wireless device, LEDs, and other components are preferably configured to fit inside an enclosure of the same design and dimensions as existing streetlights to enable the system to be retrofitted to existing light poles with little, or no, modification to the pole itself.

The enclosure is preferably water resistant and provides at least a minimum level of protection from the elements to ensure the electronic components function in a reliable manner. The enclosure can conceal and house the micro wireless device, and other components, in a device that is approved by municipalities and zoning codes for lighting, energy consumption, safety and aesthetics, which can result in timely approval, reduced paperwork, and reduced installation times.

FIG. 1 depicts a conventional cobra head streetlight. The conventional streetlight 100 comprises a conventional light fixture 102, a cross bar 104, and a light pole 106. The light pole 106 obviously supports the cross bar 104 and the conventional light fixture 102 to enable the conventional streetlight 100 to illuminate the street below. The conventional light fixture 102 can comprise an enclosure 108 and a lens 110. In some examples, the enclosure 108 can house an incandescent bulb (usually sodium vapor) as a light source and a ballast, or other power supply, to start and power the bulb. The lens 110 can be substantially clear glass or plastic (e.g., polycarbonate or acrylic) and may include optical features (e.g., patterns or lenses) to evenly disperse or focus light, as applicable.

As mentioned above, however, sodium vapor lights are not as efficient as LEDS in converting electricity into light. In addition, the yellow/pink light provided by sodium vapor light bulbs—which cannot easily be changed due to the nature of their construction—inhibits color vision at night and limits visibility, among other things. Conventional streetlights 100 are also large, consume more energy, and serve only one purpose—illuminating the street.

LED lighting, on the other hand, is capable of producing more light and less heat from a given power input. In addition, LEDs are available in a variety of color temperatures (i.e., colors) that can match the existing lighting color of the municipality or area where the unit will be installed to blend in with the other lights in the area and, in some cases, can even emit multiple colors using red/green/blue LED sets. Some LED lighting can even produce multiple colors depending on the frequency at which they are actuated. Thus, LED lighting can reduce power consumption and heat buildup in the fixture and provide light at colors that are more compatible to human vision (e.g., "daylight" frequencies). This flexibility can be used to improve night vision or match existing streetlights, among other things.

Unfortunately, new LED lighting tends to be somewhat more expensive than conventional incandescent or fluorescent technologies. Many municipalities simply may not have the funds to purchase new LED streetlights despite the many advantages. To this end, providing an enclosure that updates the fixture to LED lighting, while adding wireless connectivity at the same time, can solve two problems at the same time. In many cases, wireless communications providers may choose to bear the cost of installation in order to improve urban cellular and wireless customer experience. Thus, municipalities may be able to upgrade their streetlights at little, or no, cost to them. The wireless communications companies, on the other hand, can add focused bandwidth to their communications network at reduced cost because they need only pay for the cost of the new equipment and the cost of installation, both of which can be significantly lower than conventional cell tower installations. In addition, as discussed below, the cost of installation can be reduced significantly by using existing fixtures that are easily retrofittable from conventional streetlights 100.

Figure 2C:
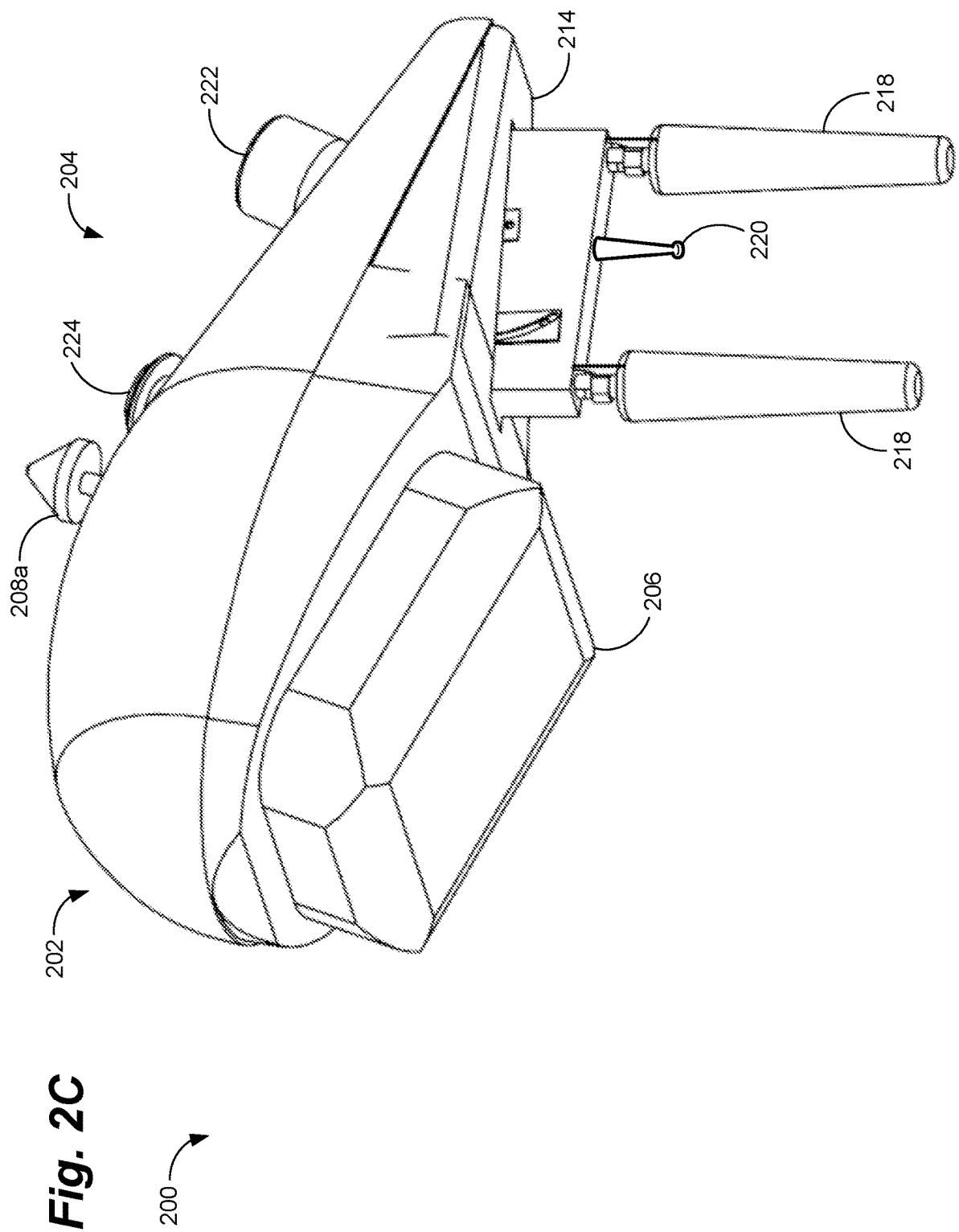
FIG. 2C is a detailed, perspective view of the cobra head streetlight with micro wireless device of FIG. 2A, in accordance with some examples of the present disclosure.

To this end, as shown in FIGS. 2A-2C, examples of the present disclosure can comprise an upgraded modular lighting system 200. FIG. 2A is a system level view, while FIGS. 2B and 2C are detailed views of the modular lighting system 200. Due to its modular nature, examples of the present disclosure can comprise an upgraded, easily retrofittable streetlight fixture 202. The fixture 202 can look substantially the same as the conventional light fixture 102, and can be easily installed on conventional light poles, but can include additional features.

As shown, many of the features can be inside the enclosure 204. As a result, despite the added features, the fixture 202 can have substantially the same appearance as the conventional light fixture 102. As discussed below, due to the flexibility of the lighting technologies using with the modular lighting system 200, the modular lighting system 200 can also be made to mimic the light color and output of conventional light fixtures 102. In this manner, though only a portion of the conventional light fixtures 102 may be replaced with the modular lighting system 200, the differences in appearance between the conventional light fixtures 102 and the modular lighting system 200 can be negligible.

In other words, to provide sufficient cell and/or wireless coverage, only perhaps one in ten conventional fixtures 102 need be replaced with the modular lighting system 200. As discussed below, however, using the flexibility of LED lighting, all fixtures (i.e., conventional fixtures 102 and upgraded fixtures 202) can look substantially the same.

As shown, like the conventional light fixture 102, the fixture 202 can include an enclosure 204 and a lens 206. The enclosure 204 can be, for example, metal, and can be sized and shaped to look and be attached substantially the same as the conventional light fixture 102. As discussed below, this can enable the modular lighting system 200 to be easily installed on existing light poles 106 by simply removing the conventional light fixture 102, making the necessary connections, and installing the new fixture 202. In addition to reduced installation costs, therefore, municipalities may also be more willing to upgrade when the new fixtures 202 and the conventional light fixtures 102 match.

As shown in FIGS. 2A and 2B, the modular lighting system 200 can comprise the enclosure 204, the lens 206, a Global Positioning System (GPS) system 208, a lighting module 210, a micro wireless device 212, (e.g., a micro wireless device, Bluetooth®, and/or Wi-Fi router), the rear cover 214, antenna angle adjuster 508, a power module 216, one or more long-range wireless antennas 218, and one or more short-range wireless antennas 220.

As mentioned above, the enclosure 204 can be designed to mimic existing streetlights. It can be aesthetically identical such that, when the conventional light fixture 102 is replaced with the modular lighting system 200, the differences are substantially undetectable to the casual observer. This can also enable the modular lighting system 200 to be installed on existing light poles with little, or no, physical modification to the pole. In other words, while additional wires or cables may be installed inside or outside the pole, the modular lighting system 200 is configured to physically interface with the existing light pole 106 (or cross bar 104, when applicable) with no modifications, reducing installation costs.

Similarly, in some examples, the lens 206 can be made to mimic the lens 110 on the conventional streetlight 100. The lens 206 can include, for example, an optical pattern to disperse the light from the lighting module 210 in a manner similar to the conventional light fixture 102. The lens 206 may also include a tint, to modify the light color of the lighting module 210 to match the conventional light fixture—e.g., to turn the relatively white light of an LED to the yellow/pink color of a sodium vapor bulb. Of course, in some examples, this can also be achieved using the LEDs alone.

Of course, one benefit of the modular lighting system 200 is the ability of municipalities to upgrade their street lighting at reduced cost. To this end, in some examples, rather than mimicking conventional streetlights 100, the modular lighting system 200 can be used to provide improved light output and color. In this manner, the lens 206 can be clear (though it may still include a dispersion pattern) such that the lighting module 210 dictates the color of the modular lighting system 200. In this manner, the modular lighting system 200 can provide color temperatures more suitable for humans.

The GPS system 208 can comprise an external GPS antenna 208a and a GPS receiver 208b. Rather than its common use for location services, however, in the modular lighting system 200, the GPS antenna 208a is used by the micro wireless device 212 for synchronization and timing purposes. In other words, to accurately synchronize the micro wireless device 212 with the macro network. This allows calls to hand in and out of the micro wireless device 212 on the macro network, and also provides timing for high speed packet data processing, among other things.

The modular lighting system 200 can also comprise a lighting module 210. In some examples, as shown in FIG. 2B, the lighting module 210 can include one or more LEDs to enable the modular lighting system 200 to illuminate the street below. In some examples, the number, type, and output of the LEDs in the lighting module 210 can be matched to existing conventional light fixtures 102. In other words, if the conventional streetlights 100 are sodium vapor lights, which produce a particular color temperature and output, the lighting module 210 can be configured to have the same, or similar, light output—i.e., the same, or similar, number of lumens of light output (i.e., brightness or luminosity) and the same, or similar, light frequency (color). This can prevent drivers from being blinded or distracted from varying streetlight light output or color as they drive. In some examples, as discussed below with reference to FIG. 4, the lighting module 210 can also comprise a cooling system to remove heat from the LEDs and any additional components (e.g., resistors, transistors, etc.).

The modular lighting system 200 can also comprise a micro wireless device 212. The micro wireless device 212 is capable of routing cellular voice and/or data transactions. The micro wireless device 212 can be connected to the LTE or other cellular network using, for example, Ethernet or fiber optic cable, and can offload traffic from local area macro towers.

In other examples, the micro wireless device 212 can have a relatively short range (e.g., on the order of 100 yards) and can be used for "spot" coverage in areas of high cellular usage. Moreover, rather than being evenly spaced every 100 yards to provide blanket coverage, in some examples, the modular lighting system 200 may be deployed only in areas where macro network usage warrants additional capacity and coverage (e.g., hotels, convention centers, apartment buildings, parks, etc.). Thus, the modular lighting system 200 may be placed based on quality-of-service (QoS) or quality of experience (QoE) metrics in areas with bandwidth shortfalls.

In some examples, the micro wireless device 212 can also include Wi-Fi (e.g., 802.11x), Bluetooth®, Ethernet, coaxial, and other connections. This can enable users to connect to the Internet using multiple methods, as appropriate for their current needs. Secure Bluetooth®, or other secure, close range communications, can also enable technicians to access the modular lighting system 200 to perform updates, configuration, and maintenance, among other things. Thus, using a short-range connection (e.g., Bluetooth®), a technician standing at street level can securely access a particular modular lighting system 200, for example, without connecting to, or interfering with, other nearby modular lighting system 200. In some examples, the micro wireless device 212 may also include microwave, or other long range communications, to provide backhaul connections from the modular lighting system 200 to the cellular network (or, "backbone," which often refers specifically to the aggregated backhaul portion of a cellular network).

The modular lighting system 200 includes a rear cover 214. The rear cover 214 can provide one or more apertures for mounting external antennas for communications. This can enable the placement of antenna angle adjuster 508 that adjusts the antenna perpendicular to the ground and at the same time parallel to the horizon. The antenna angle adjuster in turn has an adjusting capability using a slot and tightening screw on the stop 506 to hold the antenna angle adjuster 508 at a certain angle to meet the desired physical position for optimal transmission.

The modular lighting system 200 can include the power module 216. The power module 216 can provide regulated power to the lighting module 210. The micro wireless device 212, cooling system 300 (discussed below), and other electronic equipment included with the modular lighting system 200 derives power from an external source. In some examples, the power module 216 can convert AC (mains) power to DC power.

In other examples, the power module 216 can be connected to an external light sensor 222 to turn the lighting module 210 on and off at predetermined light levels (e.g., as the sun begins to set and begins to rise, respectively).

The modular lighting system 200 can also comprise one or more long-range wireless antennas 218. The long-range wireless antennas 218 can send and receive signals over various cellular (e.g., GSM, UMTS, LTE, and/or CDMA) frequencies, microwave frequencies, or other long-distance communications frequencies. The long-range wireless antennas 218 can be in communication with the micro wireless device 212 to send and receive cellular, and other relatively long range, communications signals. The long-range wireless antennas 218 can be detachable, coupled to the antenna angle adjuster 508 and can be removable and replaceable. The long-range wireless antennas 218 can be connected with suitable cabling (e.g., coaxial cable) to the micro wireless device 212 in the modular lighting system 200. In some examples, with the proper long-range wireless antennas 218 can provide microwave backhaul capabilities from the modular lighting system 200 to nearby cell towers or other facilities.

The modular lighting system 200 can also comprise one or more short-range wireless antenna 220. The short-range wireless antenna 220 can send and receive signals over various wireless system frequencies (e.g., 802.11x, Bluetooth®, or other short-range protocols). The short-range wireless antenna 220 can be in communication with the micro wireless device 212 and/or a separate micro wireless device (e.g., a Wi-Fi router) in the modular lighting system 200. The short-range wireless antennas 220 can be detachably coupled to the antenna angle adjuster 508 and can be removable and replaceable. The short-range wireless antennas 220 can be connected with suitable cabling (e.g., coaxial or Ethernet cable) to the micro wireless device 212, a wireless router, and/or other micro wireless devices in the modular lighting system 200.

The one or more short-range wireless antennas 220 and micro wireless devices can enable users close to the modular lighting system 200 to access the micro wireless device for example, without using cellular data. The one or more short-range wireless antennas 220 and micro wireless devices can also enable workers to access the modular lighting system 200 for configuration and maintenance. A worker can access the modular lighting system 200 using a laptop, cellular phone, or purpose built handheld device over a secure Bluetooth® connection, for example, to enable access, while reducing, or preventing, hacking. In addition, due to the short-range nature of the connection, the worker can access a particular modular lighting system 200 unit, without fear of connecting to other nearby modular lighting system 200 units.

In some examples, the modular lighting system 200 can also include an external light sensor 222 that can actuate the LED. The external light sensor 222 can measure ambient light levels proximate to the modular lighting system 200. This can be to control input to the power module 216 for the lighting module 210. The one-way vent 224 can enable pressure and or heat to be vented from the enclosure 204, yet prevent air and/or water from entering the enclosure. In this manner, air may enter the enclosure, for example, and be exhausted out the top by the one-way vent 224 using forced air convection. This can enable the enclosure 204 to be cooled passively, for example, while preventing water and debris from entering the enclosure 204.

Figure 3:
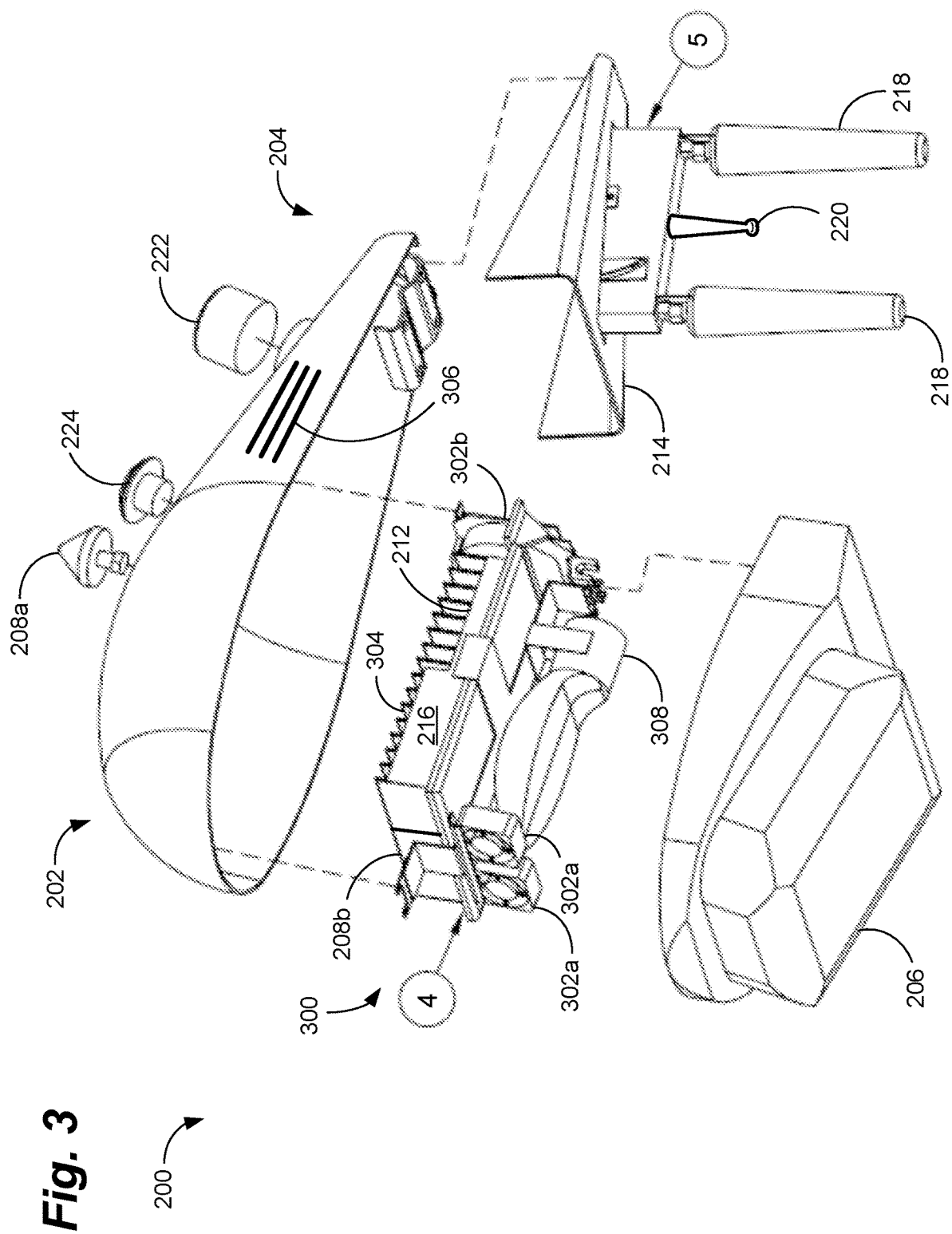
FIG. 3 is an exploded view of an example cobra head streetlight with micro wireless device including an integrated light emitting diode (LED) bulb, in accordance with some examples of the present disclosure.

As shown in FIG. 3, in some examples, the modular lighting system 200 can also include a cooling system 300. The cooling system 300 can include, for example, one or more cooling fans 302, one or more heat sinks 304, and one or more vents 306. As shown, the cooling fans 302 can be configured to circulate air within the fixture 202. In some examples, the cooling system 300 can include one or more fans 302a directed at the lighting module 210 and electronic components. One or more fans 302b can be used to extract heat through one or more vents (e.g., the vents 306 and the one-way vent 224). In addition, as discussed below, in some examples, the modular lighting system 200 can include an integrated LED bulb 308, which can include an internal cooling fan.

The cooling system 300 can also include one or more heat sinks 304, cooling blocks, radiators, hot air extractor or other equipment to remove heat from inside the enclosure 204. In some examples, the cooling system 300 can also include the one-way vent 224 and/or one or more additional vents 306, louvers, venturis, ducts, or other passive elements designed to cool the enclosure using natural airflow and/or convection.

The cooling system can be designed to remove heat generated by the electronic components of the modular lighting system 200 by components such as the lighting module 210, the micro wireless device 212, and the power module 216, among other things. The cooling system 300 can also be designed to remove heat gain caused by the sun heating the outside of the enclosure 204 that might otherwise damage the electronic components of the modular lighting system 200. In some examples, the cooling system 300 can also include a heat reflective coating on the outside of the enclosure 204. The cooling system can also include an insulating layer on the inside of the enclosure 204 (e.g., fiberglass, heat-reflective tape, etc.) to protect the electronic components of the modular lighting system 200 from extremes in both heat and cold.

In some examples, as shown in FIG. 3, rather than using an LED flat panel lighting module 210, the modular lighting system 200 can use an integrated LED bulb 308. The integrated LED bulb 308 can include, for example, an LED bulb, LED controller, and an integrated cooling fan. Using an integrated LED bulb 308 can make the lighting module 210 easier to maintain and can enable the modular lighting system 200 to provide a wide range of easily configurable luminosity (lumens) and colors (e.g., by simply changing the integrated LED bulb 308). The integrated LED bulb 308 may also provide a reduced number of parts for ease of maintenance and manufacture and reduced cost.

Figure 4:
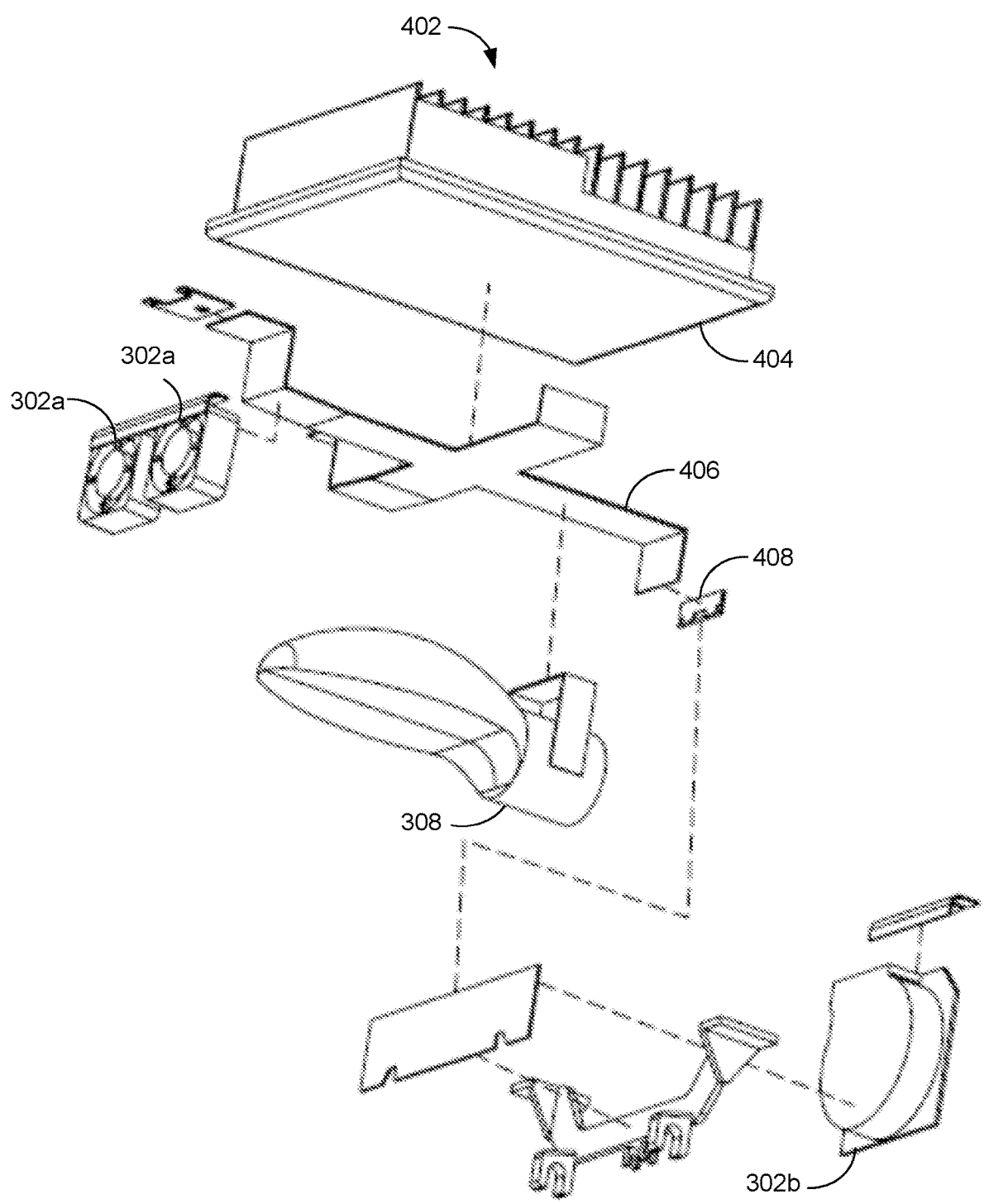
FIG. 4 is a detailed, exploded view an example cooling system for the cobra head streetlight with micro wireless device, in accordance with some examples of the present disclosure.

As shown in FIG. 4, in some examples, some or all of the electronic components 402 (e.g., GPS receiver 208b, micro wireless device(s) 212, etc.) can be mounted on an electronics tray 404. In some examples, the electronics tray 404 can be hingeably coupled to the enclosure 204. In this manner, the electronics tray 404 can be tilted down for service and then tilted up (into the enclosure 204) to enable the enclosure 204 to be closed. The electronics tray 404 can enable the electronic components 402 to be conveniently mounted and can facilitate assembly of the modular lighting system 200.

In other examples, the electronics tray 404 and a hinge 408 (or similar) can be coupled to the enclosure 204. As before, this can enable the lens 206 to be opened or removed, for example, and the electronic components 402 to be tilted down for service or installation. After service or installation is complete, the electronics tray 404 can be tilted back up into the enclosure 204 and concealed. In some examples, as shown, the bracket 406 may also support portions of the cooling system 300 (e.g., one or more of the cooling fans 302) and/or the lighting module 210 or bulb holder 308. As above, the bracket 406 and hinge 408 can enable substantially all of the serviceable components to be tilted down out of the enclosure 204 for installation and/or maintenance, with the remaining components similarly serviceable via the rear cover 214.

Figure 5:
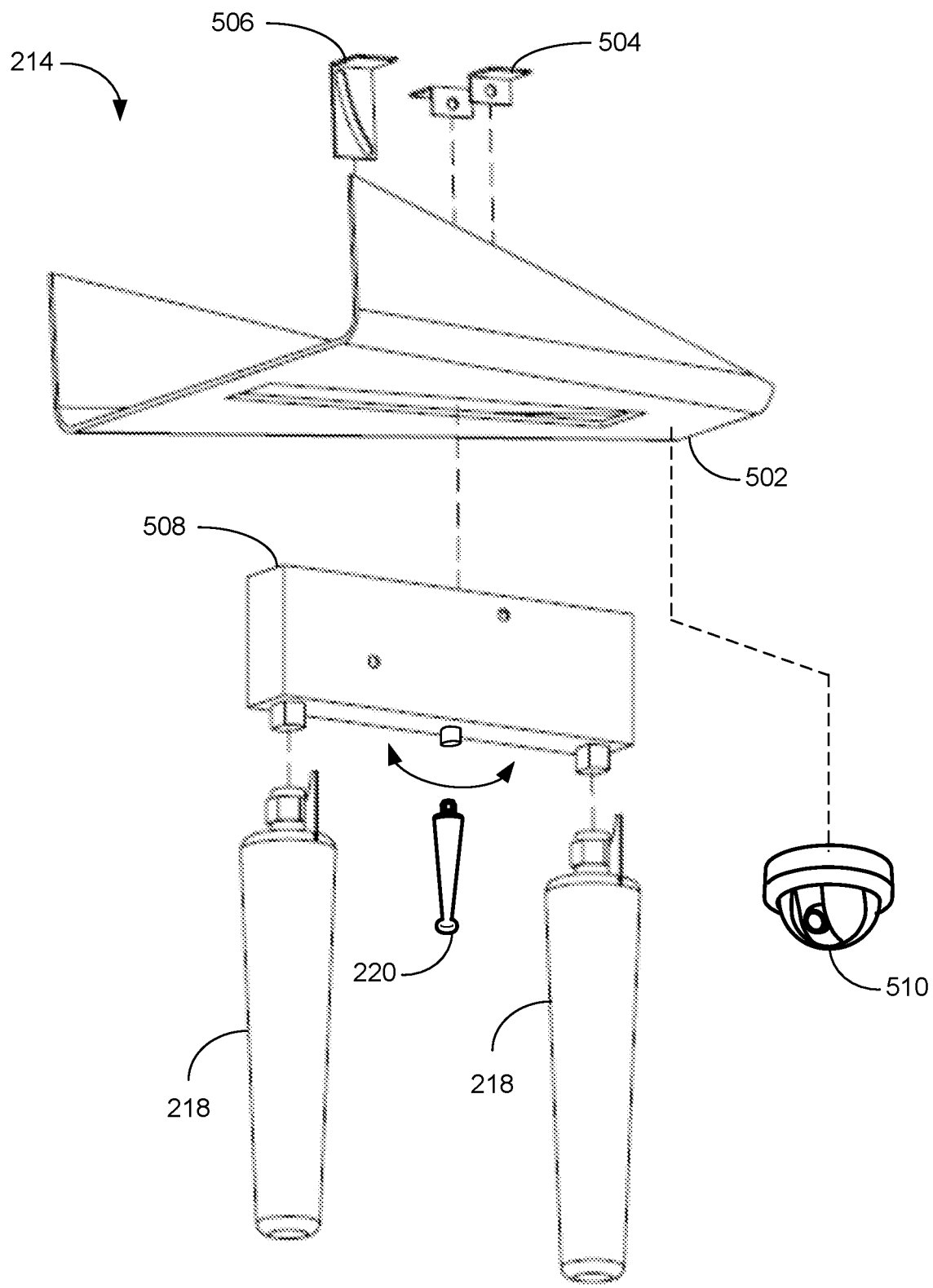
FIG. 5 is a detailed, exploded view of an example antenna holder for a cobra head streetlight with micro wireless device, in accordance with some examples of the present disclosure.
Figure 6:
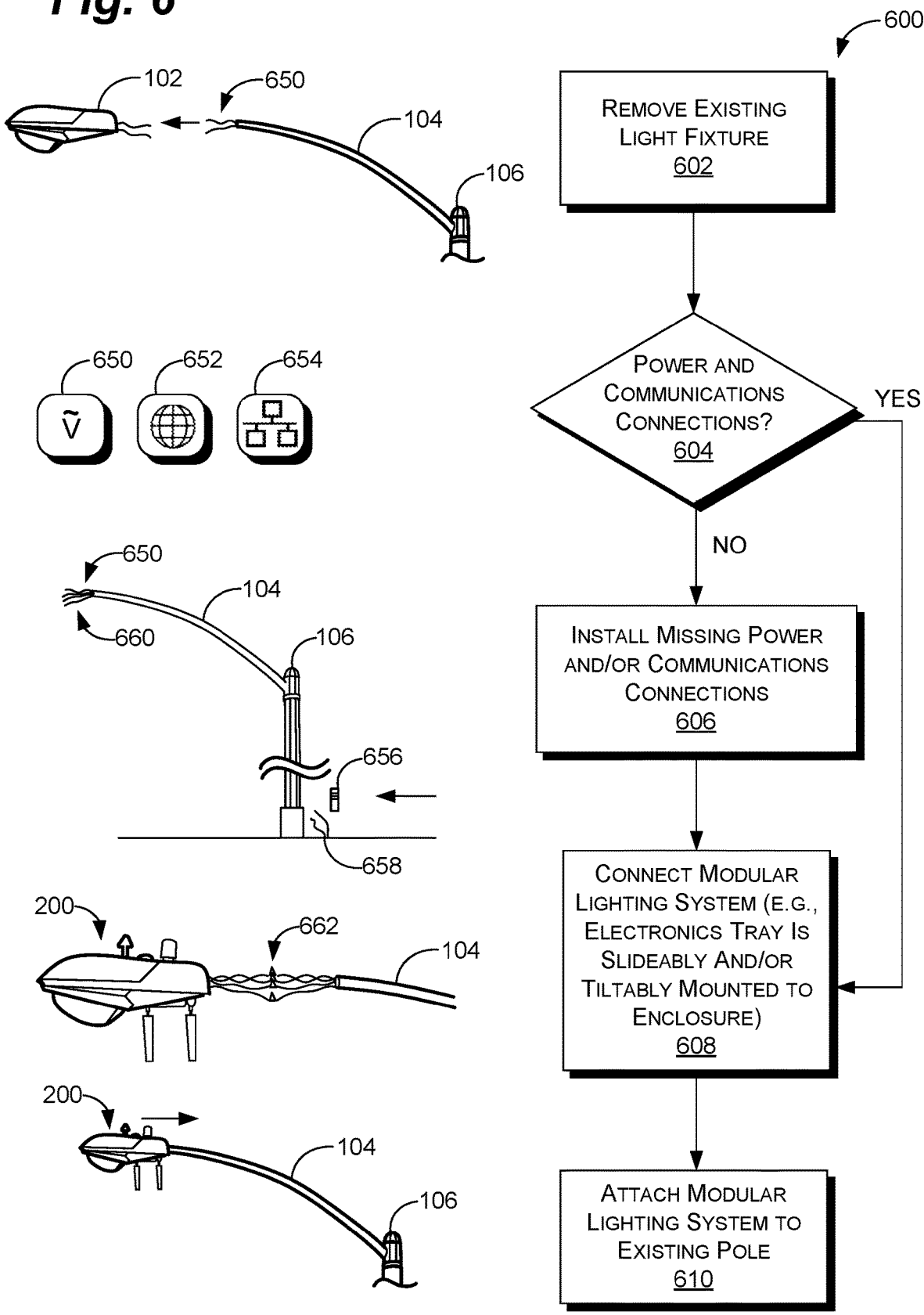
FIG. 6 is a flowchart depicting an example method for installing a cobra head streetlight with micro wireless device, in accordance with some examples of the present disclosure.

As shown in FIG. 5, the rear cover 214 can enable the antennas 218, 220 and associated cabling to be mounted and accessed. The rear cover 214 includes an outer cover 502, one or more pivots 504 (or hinges) and a stop 506. The pivots 504 can enable the antenna angle adjuster 508 to be hingeably coupled to the enclosure 204. In this manner, the outer cover 502 can be tilted down for access.

In some examples, the modular lighting system 200 can also include one or more cameras 510. These cameras can be mounted on the rear cover 214, for example, or in any suitable location on the modular lighting system 200. The camera(s) 510 can comprise a still and/or video camera and can be used for a variety of reasons. Some municipalities may wish to use the camera(s) 510 as traffic cameras 510, for example, or security cameras for use in conjunction with police traffic and crime prevention activities. In other examples, the service provider may also use the camera(s) 510 in the event the modular lighting system 200 is damaged or destroyed. The camera(s) 510 can be used to distinguish between a car accident, for example, and vandalism. In some examples, the camera(s) 510 may also be able to provide diagnostic clues, such as when the modular lighting system 200 is hit by lightning, to facilitate repair.

As the name implies, the modular lighting system 200 is modular and is, thus, designed to be easily installed on existing light poles with minimal modification. This reduces installation costs significantly over a system that requires the installation of complete pole/light/micro wireless device unit. When installing a system that replaces the entire pole, for example, the cost just to remove the old pole and install a new pole can be considerable. In addition, installing a new pole increases traffic problems due to lane closures, requires digging up streets and sidewalks, and is generally more expensive and disruptive.

To this end, examples of the present disclosure can comprise a method 600 for replacing existing light fixtures with the modular lighting system 200 to provide additional functionality at minimal cost. As mentioned above, because the modular lighting system 200 is designed to be a direct replacement for existing light fixtures, the modular lighting system 200 requires little or no modification to the existing light pole 106 and cross bar 104. Thus, while the modular lighting system 200 may require additional cabling for communications connections (depending on the existing installation), for example, the modular lighting system 200 is designed to physically mount to the existing light pole 106 and cross bar 104 without having to physically modify the light pole 106 and cross bar 104 (i.e., the modular lighting system 200 is a "direct fit" replacement).

At 602, the method 600 can begin with disconnecting and removing the conventional light fixture 102. In some examples, depending on the level of connectivity of the existing light fixtures, this can involve simply disconnecting one or more power and ground wires supplying power to the conventional light fixture 102. In some examples, power can be disconnected from the existing light fixture (e.g., at the base of the light pole 106) for safety prior to beginning work. As mentioned above, because of the design of the modular lighting system 200, however, the light pole 106 and cross bar 104 can remain in place and substantially unmodified.

At 604, the installer can determine the level of connectivity of the existing site. In most cases, the existing site will only have main power connections 650 (e.g., AC current from a municipal power source). In this configuration, the installer can add any additional data connections based on the options provided by the particular modular lighting system 200 chosen. In other words, modular lighting system 200 can be customized to provide more or less communications options and thus, may have a different number of connections from site to site.

In some examples, the modular lighting system 200 may include an internet connection 652. The internet connection 652 can comprise, for example, a separate cable, digital subscriber line (DSL), satellite, wireless, or Integrated Services Digital Network (ISDN) connections. As a result, depending on the type of connection, additional cables can be installed in the light pole 106 and cross bar 104 and connected to the internet source (e.g., a router). Of course, wireless and/or satellite connections, for example, may require only power, with no actual cabled connection.

In some examples, the modular lighting system 200 can also include an Ethernet connection 654. The Ethernet connection 654 can provide a connection between the site and various Central office modules. In some example, the Ethernet connection 654 provides cellular backhaul functionality, providing a connection between a Bluetooth® or cellular router in the modular lighting system 200, for example, and the cellular backbone. As mentioned above, this can enable the site to include a micro wireless device, picocell, femtocell, or other cellular router, to offload traffic from macro cells, as needed.

At 606, the identified power and/or communications connections can be added to the site. This can include installing a junction box 656, switch, or other hardware near the base of the light pole 106. This can also include making additional power or communications connections 658 to existing utilities (e.g., underground utility connections). This can also include installing cabling 660 through the light pole 106 and cross bar 104 for connection to the modular lighting system 200. The cabling 660 can include, for example, additional power wires, coaxial cable, Ethernet cable, twisted wire pairs, or any other needed wired connections. The cabling 660 can be run inside or outside the light pole 106 and cross bar 104, depending on the number of connections and the space available inside the light pole 106 and cross bar 104. In some examples, a conduit, raceway, or other cable storage system can be added to the light pole 106, though this is generally not needed.

At 608, the installer can make any necessary connections 662 between the modular lighting system 200 and the cabling 660. As discussed above, the components (e.g., the power module 216) of the modular lighting system 200 can include internally regulated power sources to enable the components to be connected directly to main power. In this manner, additional power cabling and connections are obviated. Preferably, the existing mains power connection for the conventional light fixture 102 can provide the only power connection for the modular lighting system 200.

In some examples, the micro wireless device 212 can be connected to a separate mains power and one or more communications connections (e.g., the internet 652 and/or Ethernet 654 connections). In some examples, the micro wireless device 212 can include a cellular micro wireless transceiver, for example, to provide short-range cellular connections to users nearby the site. This can remove some of the burden from macro cells and may provide faster connection speeds for users. In some examples, the micro wireless device 212 can also include Wi-Fi, Bluetooth®, and other short-range wireless connections to enable users to access voice and data features, for example, without using cellular data. In some examples, the short-range wireless connections can also be used by the installer and technicians to program, update, and maintain the modular lighting system 200.

At 610, the installer can attach the modular lighting system 200 to the cross bar 104 (or light pole 106, as applicable). As mentioned above, because the modular lighting system 200 is designed to be substantially similar to the conventional light fixture 102 in size and shape and the way it interfaces with the light pole 106 or cross bar 104, the modular lighting system 200 installs easily on the existing cross bar 104 and light pole 106 with little or no modification. In this manner, the modular lighting system 200 is substantially cheaper and faster to install. Indeed, the cost for a new light pole alone plus the labor and materials (e.g., concrete) for installation can be expensive per site, not to mention the cost to install the additional functionality the modular lighting system 200 provides. In contrast, the conventional light fixture 102 can be removed and the modular lighting system 200 installed in its place.

In addition, with the exception of the external antennas and sensors, the modular lighting system 200 can be designed to be substantially indistinguishable from the conventional light fixture 102. Thus, while described herein as a replacement for "cobra head" style conventional light fixtures 102, the modular lighting system 200 can be designed to mimic other styles of lights, as necessary. The system can be used to replace "shoebox" style light fixtures, for example, often used in mall and commercial properties. The system can also be used to replace "acorn" style light fixtures, which are often used in town centers and other areas where décor is paramount. Indeed, the system can be manufactured to mimic virtually any light fixture, provided there is sufficient room for the desired electronics. As mentioned above, due to the flexibility of LED lighting, the modular lighting system 200 can also be programmed to provide substantially the same light output and color as the conventional light fixture 102. In this manner, while the modular lighting system 200 may be placed sporadically throughout a city based on bandwidth needs, all streetlights—i.e., both the modular lighting system 200 and the remaining conventional lighting fixtures 102—can look substantially the same and provide substantially the same level and quality of light.

Figure 7:
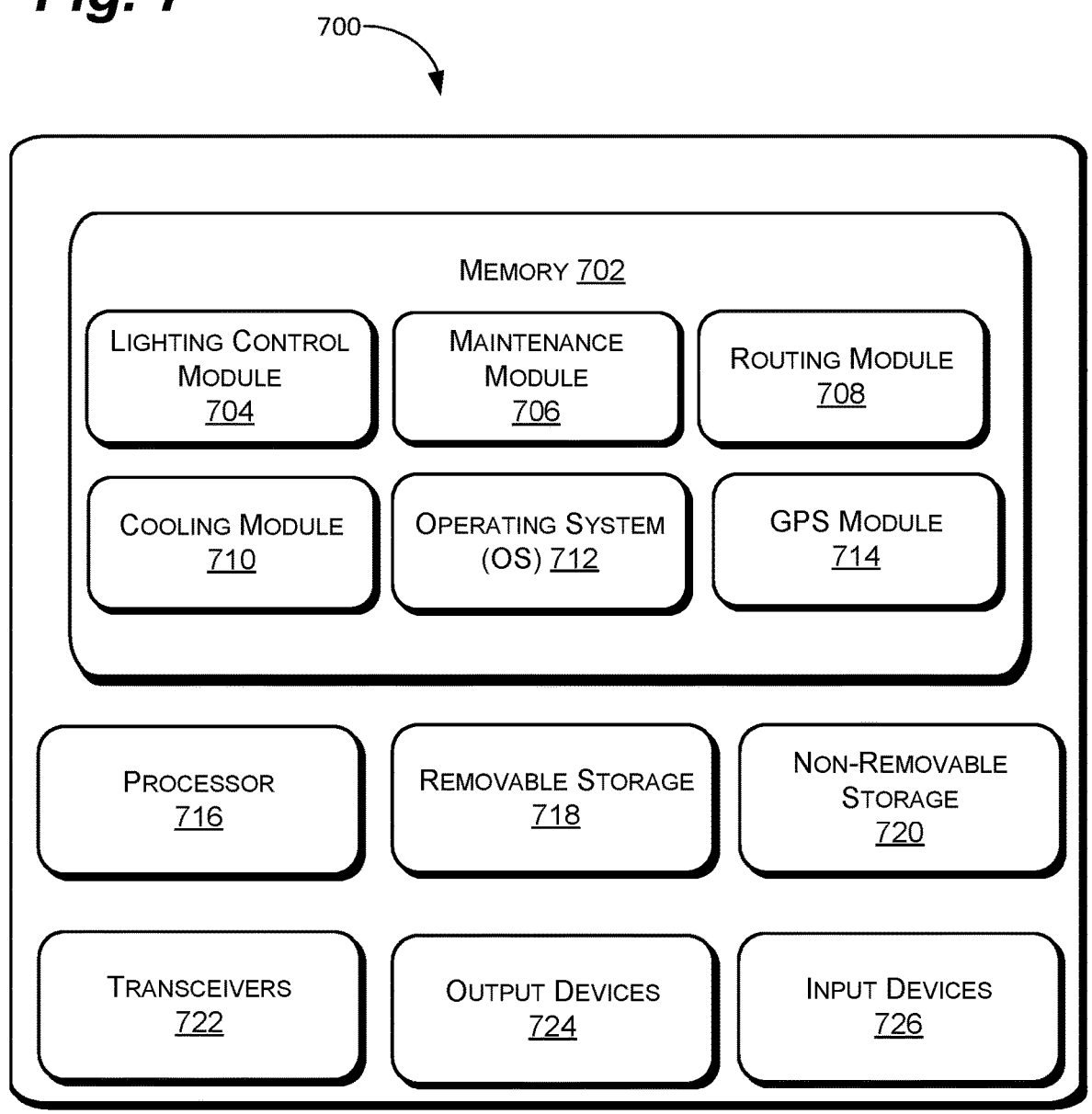
FIG. 7 is an example system architecture for an integrated module.

As discussed above, in some examples, the electronic components 402 can be mounted together on the electronics tray 404 and can include the micro wireless device(s) 212, and other components. As shown in FIG. 7, in some examples, the electronic components 402 may be included as an integrated module 700. In this configuration, the electronic components 402 can be mounted on the same, or a few, printed circuit boards (PCBs), for example, or can be included in one or more integrated circuits (ICs). This can enable the modular lighting system 200 to be manufactured and installed quickly and easily, reducing costs and increasing reliability. To this end, the integrated module 700 can include many features such as, for example, memory 702, a lighting control module 704, maintenance module 706, routing module 708, cooling module 710, operating system (OS) 712 and GPS module 714.

The integrated module 700 can also include the lighting control module 704. As the name implies, the lighting control module 704 can control one or more aspects of the lighting module 210 (or integrated LED bulb 308). The lighting control module 704 can receive inputs from the power module 216, external light sensor 222, and other components and, in turn, can control the frequency and/or voltage of the power applied to the lighting module 210. Thus, the lighting control module 704 may, for example, slowly increase voltage to the lighting module 210 as then sun sets, and vice-versa, to maintain a consistent level of illumination at the street level. The lighting control module 704 may also reduce light output (e.g., in concert with the cooling module 710), for example, in response to a predetermined rise in temperature in the enclosure 204.

The integrated module 700 can also include the maintenance module 706. The maintenance module 706 can monitor various components in the modular lighting system 200 and provide data and/or error logging. Thus, the maintenance module 706 can contact a central control, for example, in response to a fault in the modular lighting system 200 to prompt a remote or on-site technician to diagnose and/or repair the modular lighting system 200. In some examples, the maintenance module 706 can also provide secure short-range communications to technicians via a short-range wireless connection (e.g., via secure Bluetooth®). In some examples, the maintenance module 706 may also provide maintenance messages to the central control or a technician at predetermined time intervals, hours of use, or another metric.

The integrated module 700 can also include the routing module 708. The routing module 708 can be used to route cellular and wireless communications between users and the modular lighting system 200. The routing module 708 can include, for example, a cellular router, a Wi-Fi router, and a Bluetooth® router, among other things. The routing module 708 can be used in conjunction with the micro wireless device(s) 722 to connect users to appropriate communications channels.

The integrated module 700 can also include the cooling module 710. The cooling module 710 can be used in conjunction with the cooling system 300 to monitor and control the temperature of the components and/or inside the enclosure 204. The cooling module 710 may receive inputs from a temperature sensor inside the enclosure 204, for example, cooling fan speeds from the cooling fans 302, outside temperature sensors, and/or internet or cellular weather data. The cooling module 710 can control the cooling fans 302 via voltage, frequency, or both in response to changes in temperature for the modular lighting system 200.

The integrated module 700 can also include the GPS module 714. The GPS module 714 can receive and interpret data from the GPS system 208, including primarily timestamp information from one or more GPS satellites. The GPS module 714 can provide this information to the OS 712, for example, and/or the routing module 708 for cellular and wireless timestamping and routing purposes.

The integrated module 700 may also include additional data storage devices (removable and/or non-removable) such as, for example, magnetic disks, optical disks, or tape.

Such additional storage is illustrated in FIG. 7 by removable storage 718 and non-removable storage 720. The removable storage 718 and non-removable storage 720 can store the various modules 704, 706, 708, 710, 714 and the OS 712, among other things. This can enable the integrated module 700 to be fully or partially configured to provide graphical user interfaces (GUIs), for example, to enable users and/or technicians to connect to the modular lighting system 200. The removable storage 718 and non-removable storage 720 can also include setup menus, other GUIs, and other functions.

Non-transitory computer-readable media may include volatile and nonvolatile, removable and non-removable tangible, physical media implemented in technology for storage of information, such as computer readable instructions, data structures, program modules, or other data. The memory 702, removable storage 718, and non-removable storage 720 are all examples of non-transitory computer-readable media. Non-transitory computer-readable media include, but are not limited to, RAM, ROM, electronically erasable programmable ROM (EEPROM), flash memory or other memory technology, compact disc ROM (CD-ROM), digital versatile disks (DVD) or other optical storage, magnetic cassettes, magnetic tape, magnetic disk storage or other magnetic storage devices, or any other tangible, physical medium which can be used to store the desired information and which can be accessed by the integrated module 700. Any such non-transitory computer-readable media may be part of the integrated module 700 or may be a separate database, databank, remote server, or cloud-based server.

In some implementations, the micro wireless device(s) 722 include any sort of micro wireless devices known in the art. In some examples, the micro wireless device(s) 722 can include wireless modem(s) to facilitate wireless connectivity between users and the cellular network, the Internet and/or an intranet via a cellular connection. Further, the micro wireless device(s) 722 may include a radio micro wireless device that performs the function of transmitting and receiving radio frequency communications via an antenna (e.g., Wi-Fi or Bluetooth®). In other examples, the micro wireless device(s) 722 may include wired communication components, such as a wired modem or Ethernet port, for communicating with technicians, for example, and the provider's Internet-based network.

In some implementations, the output device(s) 724 include any sort of output devices known in the art, such as a display (e.g., a liquid crystal or thin-film transistor (TFT) display), a touchscreen display, loud speakers, a vibrating mechanism, or a tactile feedback mechanism. In some examples, the output devices can play various sounds based on, for example, whether the integrated module 700 is connected to a network, the type of connections (e.g., cellular vs. Wi-Fi), the number of active calls, etc. for testing purposes. Output device(s) 724 also include ports for one or more peripheral devices, such as headphones, peripheral speakers, or a peripheral display for use by technicians during maintenance procedures, among other things.

In various implementations, input device(s) 726 include any sort of input devices known in the art. For example, the input device(s) 726 may include one or more still or video cameras (e.g., camera 410, discussed above), a microphone, a keyboard/keypad, or a touch-sensitive display. A keyboard/keypad may be a standard push button alphanumeric, multi-key keyboard (such as a conventional QWERTY keyboard), virtual controls on a touchscreen, or one or more other types of keys or buttons, and may also include a joystick, wheel, and/or designated navigation buttons, or the like.

As mentioned above, the input device(s) 726 can also include temperature sensors located inside and outside the enclosure 204 such as, for example, temperature sensors on the integrated module 700, the heat sink 304, the cooling fans 302, and/or the lighting module 210. The input device(s) 726 can also include one or more external temperature sensors to provide ambient temperatures proximate the modular lighting system 200. The input device(s) 726 can also include one or more fan speed sensors, voltage sensors, or other sensors used to monitor the performance and conditions of the modular lighting system 200.

While several possible embodiments are disclosed above, embodiments of the present disclosure are not so limited. For instance, while systems and methods for use with cellular phone systems have been disclosed, the system could provide communications bandwidth in other spectrums in a similar manner without departing from the spirit of the disclosure. In addition, the location and configuration used for various features of embodiments of the present disclosure such as, for example, the LED lighting module 210, the types of cellular technologies, and the antennas can be varied according to a particular network or application that requires a slight variation due to, for example, the size or construction of the cellular network, the communication protocols, or the local infrastructure. Such changes are intended to be embraced within the scope of this disclosure.

The specific configurations, choice of materials, and the size and shape of various elements can be varied according to particular design specifications or constraints requiring a device, system, or method constructed according to the principles of this disclosure. Such changes are intended to be embraced within the scope of this disclosure. The presently disclosed embodiments, therefore, are considered in all respects to be illustrative and not restrictive. The scope of the disclosure is indicated by the appended claims, rather than the foregoing description, and all changes that come within the meaning and range of equivalents thereof are intended to be embraced therein.

What is claimed is:

1. A system comprising:
   an enclosure comprising a first end and a second end, the enclosure configured to couple with at least one of a light pole or a cross bar;
   a light positioned at least partly within the enclosure and proximate to the first end of the enclosure;
   a pivotable antenna mount positioned at least partly within the enclosure between the light and the second end, the enclosure including a rear portion proximate to the second end comprising a bottom surface with an opening through which the pivotable antenna mount at least partly extends; and
   one or more antennas for wireless communication coupled to the pivotable antenna mount.

2. The system of claim 1, further comprising a slotted stop for coupling the pivotable antenna mount to the rear portion at an adjustable angle.

3. The system of claim 2, wherein the slotted stop couples to a side of the pivotable antenna mount with a tightening screw.

4. The system of claim 1, further comprising:
   a first pivot hole disposed on a first side of the pivotable antenna mount;
   a second pivot hole disposed on a second side of the pivotable antenna mount substantially across from the first pivot hole; and a pivot bar passing through the first pivot hole and the second pivot hole and coupling to an interior surface of the enclosure.

5. The system of claim 1, wherein the one or more antennas comprise:
a first antenna for short-range wireless communication extending from a bottom surface of the pivotable antenna mount; and
a second antenna for long-range wireless communication extending from the bottom surface of the pivotable antenna mount.

6. The system of claim 1, wherein the enclosure comprises a cobra head streetlight-style shape.

7. A streetlight comprising:
an enclosure comprising an end for coupling the streetlight to a pole;
a light positioned at least partly within the enclosure;
a pivotable antenna mount positioned at least partly within the enclosure between the light and the end;
a rear portion comprising a bottom surface with an opening through which the pivotable antenna mount extends; and
one or more antennas for wireless communication coupled to the pivotable antenna mount.

8. The streetlight of claim 7, further comprising a slotted stop for coupling the pivotable antenna mount to the rear portion at an adjustable angle.

9. The streetlight of claim 8, wherein the slotted stop couples to a side of the pivotable antenna mount with a tightening screw.

10. The streetlight of claim 7, further comprising:
a first pivot hole disposed on a first side of the pivotable antenna mount;
a second pivot hole disposed on a second side of the pivotable antenna mount substantially across from the first pivot hole; and
a pivot bar passing through the first pivot hole and the second pivot hole and coupling to an interior surface of the enclosure.

11. The streetlight of claim 7, wherein the one or more antennas comprise:
a first antenna for short-range wireless communication extending from a bottom surface of the pivotable antenna mount; and
a second antenna for long-range wireless communication extending from the bottom surface of the pivotable antenna mount.

12. The streetlight of claim 7, wherein the enclosure comprises a cobra head streetlight-style shape.

13. A device comprising:
an enclosure, the enclosure configured to couple with at least one of a light pole or a cross bar;
a light positioned at least partly within the enclosure;
a pivotable antenna mount positioned at least partly within the enclosure substantially adjacent to the light;
one or more antennas for wireless communication coupled to the pivotable antenna mount; and
a cooling system disposed at least partly within the enclosure, the cooling system comprising at least one of:
one or more fans directed to a one-way valve to an outside of the enclosure; or
a one-way vent at a top of the enclosure.

14. The device of claim 13, wherein the cooling system comprises one or more cooling fans within the enclosure proximate to the light.

15. The device of claim 13, wherein the enclosure includes one or more heat sinks.

16. The device of claim 13, wherein the cooling system comprises a reflective coating on an exterior of the enclosure.

17. The device of claim 13, wherein the cooling system comprises the one or more fans directed to the one-way valve to the outside of the enclosure.

18. The device of claim 13, wherein the cooling system comprises the one-way vent at the top of the enclosure.

19. The system of claim 1, further comprising a cooling system disposed at least partly within the enclosure.

20. The system of claim 19, wherein the cooling system comprises of at least one of:
one or more fans directed to a one-way valve to an outside of the enclosure; or
a one-way vent at a top of the enclosure.

* * * * *